United States Patent [19]
Freist et al.

[11] Patent Number: 6,152,259
[45] Date of Patent: Nov. 28, 2000

[54] SOUND DEADENING LAMINATE

[75] Inventors: Christoph Freist, Bielefeld; Josef Polak, Bodenheim, both of Germany

[73] Assignee: CWW-GERKO Akustik GmbH & Co., KG, Worms, Germany

[21] Appl. No.: 09/236,571

[22] Filed: Jan. 26, 1999

[30] Foreign Application Priority Data

Jan. 30, 1998 [DE] Germany .......................... 198 03 527

[51] Int. Cl.$^7$ ................................ E04B 1/82; E04B 2/02
[52] U.S. Cl. .......................... 181/290; 181/200; 181/202; 181/286
[58] Field of Search ..................... 181/290, 294, 181/286, 284, 202, 201, 200, 198, 175

[56] References Cited

U.S. PATENT DOCUMENTS

| | | | |
|---|---|---|---|
| 4,308,308 | 12/1981 | Sachse | 428/168 |
| 4,463,049 | 7/1984 | Kracke | 428/281 |
| 5,094,318 | 3/1992 | Maeda et al. | 181/290 |
| 5,414,232 | 5/1995 | Wilson | 181/292 |
| 5,554,830 | 9/1996 | Muller et al. | 181/290 |
| 5,665,447 | 9/1997 | Greaves et al. | 428/68 |
| 5,744,763 | 4/1998 | Iwasa et al. | 181/286 |
| 5,787,668 | 8/1998 | Carkner et al. | 52/408 |
| 5,787,677 | 8/1998 | Bolich et al. | 52/784.15 |

FOREIGN PATENT DOCUMENTS

| | | |
|---|---|---|
| 395 454 | 1/1993 | Austria . |
| 23 02 825 | 7/1973 | Germany . |
| 23 12 417 | 9/1973 | Germany . |
| 19 26 224 | 11/1976 | Germany . |
| 30 03 798 | 8/1981 | Germany . |
| 82 01 510 | 9/1982 | Germany . |
| 33 03 545 | 9/1984 | Germany . |
| 34 13 878 | 10/1984 | Germany . |
| 34 17 076 | 2/1985 | Germany . |
| 32 43 620 | 10/1985 | Germany . |
| 38 17 311 | 12/1988 | Germany . |
| 40 30 710 | 4/1991 | Germany . |
| 41 10 291 | 10/1992 | Germany . |
| 42 27 957 | 2/1994 | Germany . |
| 43 24 004 | 1/1995 | Germany . |
| 44 28 613 | 2/1996 | Germany . |
| 195 45 097 | 6/1997 | Germany . |
| 43 36 529 | 8/1997 | Germany . |

*Primary Examiner*—Robert E. Nappi
*Assistant Examiner*—Edgardo San Martin
*Attorney, Agent, or Firm*—Evenson, McKeown, Edwards & Lenahan, P.L.L.C.

[57] ABSTRACT

A noise-deadening laminate board configured for noise deadening having a bituminous layer more than 1 mm thick, bonded to one side of a thermal insulation layer of foam, felt or the like, and an adhesive layer on the other side of the thermal insulation layer for adhesion to a component to be improved acoustically, the bituminous layer, thereby being located on the outer side of the laminate board.

8 Claims, 1 Drawing Sheet

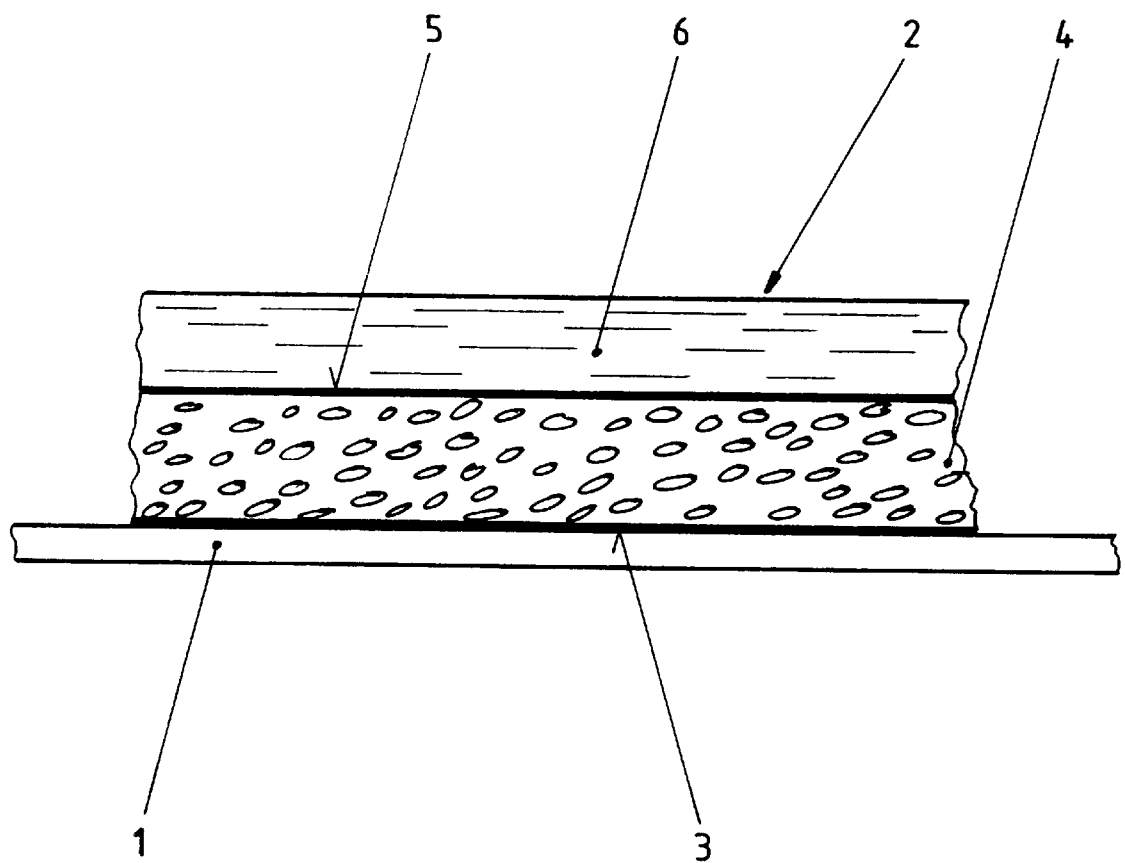

SOUND DEADENING LAMINATE

BACKGROUND AND SUMMARY OF THE INVENTION

The invention relates to a sound-deadening laminate and, more particularly, to a sound-deadening laminate having a bituminous sound-deadening layer more than 1 mm thick and an additional layer of foam, felt or the like bonded thereto by an adhesive layer.

This application claims the priority of German Patent Application No. 198 03 527.6, filed Jan. 30, 1998, the disclosure of which is expressly incorporated by reference herein.

Such a laminate is the subject of German Gebrauchsmuster 90 13 663.2 U1. The laminate described in this document serves especially to suppress the droning of the floor of a motor vehicle. The laminate is cemented with its bituminous sound-deadening layer against the floor plate. In the document it is expressly stated that the bituminous layer can be effective only if it is perfectly in contact with the car body and is firmly cemented to it.

Laminates for suppressing the vibration of metal surfaces are known which are cemented with a foam layer onto the surface to be damped, and onto the outer side of which a metal foil is cemented. Such a laminate is shown for example in DE 34 08 411 C2. Due to the metal foil the laminate is able to damp vibrations very well, but it is too expensive to manufacture for a good number of applications. Furthermore, on account of its low mass the laminate described in this patent is suitable only for damping body sounds, but not for the simultaneous suppression of noise.

In the case of dishwashing machines the problem arises that the walls of the wash tub have a strong tendency to vibrate, so that vibration damping is indispensable. At the same time, however, air noise is produced, the diffusion of which is also to be limited by a noise-blocking means. This has been attempted previously by means of a relatively thick bituminous layer on the outside of the wash tub. Quite recently, however, the requirement has developed for insulating the tubs of dishwashing machines thermally as well, so as to minimize energy consumption. In this case it is to be objected that bituminous damping coatings absorb a relatively great amount of heat, and can radiate it outwardly on account of their black color, and therefore they are poor insulators.

The invention is addressed to the problem of designing a noise-deadening laminate of the kind described above, such that a substantial noise suppression and thermal insulation can be achieved simultaneously therewith.

This problem is solved according to the invention in that the additional layer is configured as a thermal insulating layer and is provided with an adhesive layer for adhesion to a component that it to be improved acoustically, and that the bituminous layer is placed on the outer side of the laminate.

Such a laminate is a reversal of the laminate according to the disclosure DE 90 13 663.2 U1 referred to above in that, contrary to the teaching of the petty patent, the sound-damping film formed by the bituminous layer is not cemented to the metal but lies externally on the other layer. Surprisingly it has been found that, in spite of the lack of a metal foil, which would make the laminate undesirably expensive, a very good vibration damping and simultaneous noise suppression can be achieved. Additionally, the second layer results in good thermal insulation. Since the thermal insulation is situated between the wall of the washer tub and the bituminous layer, the temperature of the bituminous layer rises relatively little. At the end of the rinsing and drying cycle of the dishwasher, on account of the thermal insulating layer between it and the tub, the bituminous layer radiates the heat it has absorbed to the outside air and not to the wall of the tub. After the dishes have dried, this prevents the wall of the tub from being heated by the bituminous layer to a temperature appreciably above the temperature of the dishes, causing moisture to be absorbed from the air inside of the tub in the wall area and precipitating on the cooler dishes, producing an unwanted formation of condensate on the dishes. This would be the case if the bituminous layer were to be cemented directly to the wall of the dishwasher tub and a thermal insulating layer were to be applied to the bituminous layer.

Other than in the operating examples, or where otherwise indicated, all numbers expressing wavelengths, quantities of ingredients, or reaction conditions used herein are to be understood as modified in all instances by the term "about".

Since the laminate according to the invention requires no metal foil it is very inexpensive to manufacture, so that it can be used in mass-produced goods in which expensive noise suppressing boards with metal foils are out of the question for reasons of cost.

The laminate can be manufactured especially economically if the additional layer is formed from a thermoplastic hard foam such as polystyrene foam or polyethylene foam.

For the wash tub of a dishwashing machine a sufficiently great noise deadening and blocking, combined with a substantial thermal insulation, will result without the danger of forming condensate on the dishes in the tub, if according to another embodiment of the invention the additional layer is a 6 mm thick polystyrene foam board and the bituminous damping layer is bitumen F 24 of 3.9 mm thickness and has a weight per unit of surface area of 6.75 kg/m$^2$.

Other objects, advantages and novel features of the present invention will become apparent from the following detailed description of the invention when considered in conjunction with the accompanying drawings.

BRIEF DESCRIPTION OF THE DRAWINGS

The single FIGURE is an enlarged elevational view in cross-section of the sound deadening laminate of the instant invention.

DETAILED DESCRIPTION OF THE PREFERRED EMBODIMENT

The drawing shows a portion of a component 1 which is the wall 1 of 1 mm thick sheet steel of the tub of a dishwashing machine. Onto this component 1 a laminate 2 is adhered with a layer 3 of cement. This cement layer 3 bonds a 6 mm thick layer 4 of polystyrene foam to the component 1. With an additional layer of adhesive 5 a 3.9 mm thick bituminous noise deadening layer 6 is bonded to layer 4.

The adhesive layer 3 can be a cold adhesive—also called a self-adhesive—which prior to the application of the laminate board 2 is covered with a protective material. In such a case it is necessary only to remove the protective material and press the laminate against the wall of the dishwasher tub. It is also possible, however, to provide a hot-melt glue as the adhesive layer. Then the laminate 2 is pressed against the preheated dishwasher tub, so that the hot-melt glue is activated, and then the tub is cooled if necessary with water.

To test the acoustic and thermal properties of the laminate of the invention, the top, back and right and left sides of a dishwashing machine, but not the floor of the tub for structural reasons, are covered externally with the above-described laminate. For comparison, the tub of another dishwashing machine was provided externally with only a bituminous layer of the same quality and thickness as the one on the foam layer. It was found that the sound level in a room at one meter's distance from the dishwashing machine remained more or less unchanged, but the energy consumption for a wash fell from 1.6 KWh to 1.4 KWh.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A noise-deadening laminate board configured for noise deadening comprising a bituminous layer more than 1 mm thick, a discrete thermal insulation layer directly bonded at one side thereof to said bituminous layer with an adhesive layer, and an adhesive layer on the other side of said thermal insulation layer for adhesion directly to a component to be improved acoustically, said bituminous layer, thereby being disposed on the outer side of the laminate board.

2. The laminate board according to claim 1, wherein the discrete thermal insulation layer is made of foam or felt.

3. A laminate board according to claim 2, wherein the thermal insulation layer is formed from a thermoplastic hard foam.

4. A laminate board according to claim 3, wherein said thermoplastic hard foam is polystyrene foam or polyethylene foam.

5. A laminate board according to claim 4, wherein said thermoplastic hard foam is polystyrene foam.

6. A laminate board according to claim 5, wherein the thermal insulation layer is a 6 mm thick polystyrene foam board and the bituminous layer is bitumen F 24 of 3.9 mm thickness and a weight per unit of surface area of 6.75 kg/m$^2$.

7. A noise-deadening laminate board for thermally insulating and acoustically improving a wall component layer comprising:
   a bituminous layer;
   a discrete thermal insulation layer directly bonded along one side to the bituminous layer with an adhesive;
   the wall component layer, which is to be thermally insulated and acoustically improved, directly bonded to another side of the thermal insulation layer with an adhesive such that the bituminous layer is disposed on an outer side of the laminate board.

8. The laminate board according to claim 6, wherein the discrete thermal insulation layer is made of foam or felt.

* * * * *